June 20, 1939.  C. A. NERACHER  2,162,784
CLUTCH
Filed Aug. 26, 1936
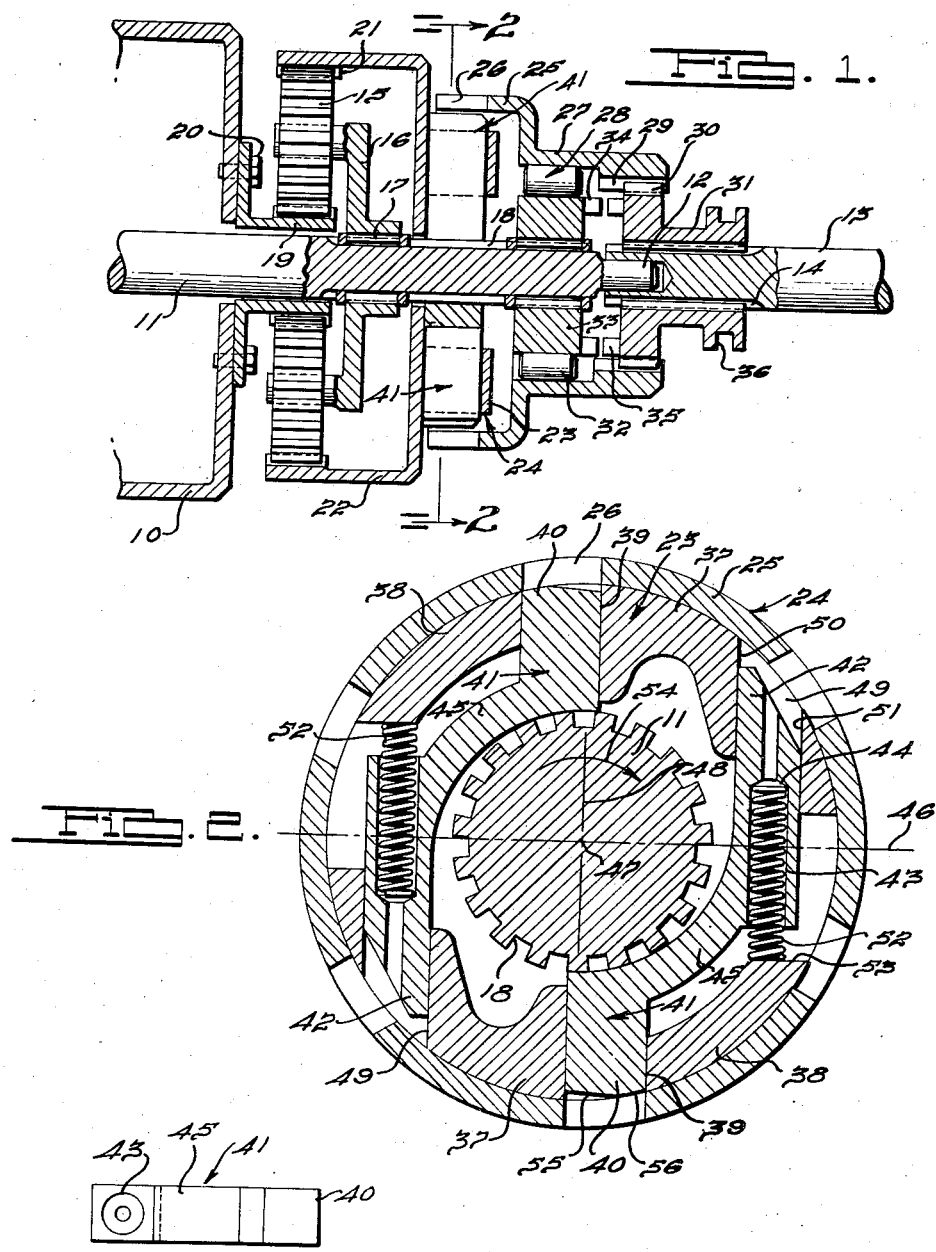
INVENTOR
Carl A. Neracher.
BY
Harness, Dickey, Pater & Harris
ATTORNEYS.

Patented June 20, 1939

2,162,784

UNITED STATES PATENT OFFICE 2,162,784

CLUTCH

Carl A. Neracher, Detroit, Mich., assignor to Chrysler Corporation, Highland Park, Mich., a corporation of Delaware Application August 26, 1936, Serial No. 97,867

11 Claims. (Cl. 192—105)

This invention relates to clutches and refers more particularly to centrifugal clutches of the positive synchronous engaging type such as are used in controlling motor vehicle power driving mechanism including transmissions, overdrives and the like.

One object of my invention is to provide improvements in the clutching characteristics of the aforesaid mechanism whereby to provide more positive operation of the clutch with less wear of the parts and noise during operation, especially when synchronizing the clutch parts preparatory for the clutch engagement.

Additional objects of my invention are to provide an improved clutch of the type aforesaid, which is simpler in construction and cheaper to manufacture than more conventional cluthes; also a clutch which has a minimum of friction and an improved distribution of weight whereby the pawl may be made relatively light in weight with resulting improvements in its action by the spring and under centrifugal force.

With the foregoing and other objects in view, I have provided a clutch having an improved construction and arrangement of parts more particularly illustrated in one embodiment thereof in the accompany drawing, in which:

Fig. 1 is a sectional elevational view somewhat diagrammatic in form, illustrating one application of my clutch to a motor vehicle power transmission mechanism.

Fig. 2 is a sectional elevational view through my clutch, the sections being taken as indicated by the lines 2—2 of Fig. 1.

Fig. 3 is a plan view looking down on the pawl illustrated at the top of Fig. 2.

In order to illustrate one form of application of my clutch, I have shown in Fig. 1 a motor vehicle overdriving mechanism, it being understood that my clutch is adapted for use with a wide variety of mechanisms wherever it is desired to clutchingly connect parts of a mechanism which are adapted to have their rotational speeds synchronized. This overdriving mechanism comprises a conventional change speed transmission 10 from which the drive is taken by a drive shaft 11 piloted at its rear end 12 in the forward end of a driven shaft 13 having the splines 14.

The overdrive gearing is illustrated as the planetary type having the planetary pinions 15 supported by a carrier 16 drivingly connected at 17 with the splines 18 of the drive shaft 11. These planetary pinions engage a sun gear 19 non-rotatably secured at 20 to the housing of transmission 10, the planetary pinions also engaging an internal gear 21 having a rearward extension 22 for carrying the pawl core or cage 23 of the automatic clutch 24.

The other clutching structure of the automatic clutch 24 comprises a rotatable shell 25 formed with a plurality of circumferentially spaced pawl receiving slots 26, this shell 25 having a rearward extension 27 forming the outer cylindrical member of an overrunning clutch 28, this extension also being formed with the internal splines 29 engaged by corresponding splines 30 of an axially shiftable manually controlled clutching device 31 having a driving connection with the splines 14 of driven shaft 13.

The overrunning clutch 28 is provided with the usual clutching rollers 32 acted upon in the well known manner by the inner overrunning clutch cam member 33 divingly connected to splines 18. Cam 33 is formed with an annular series of clutching teeth 34 adapted for engagement with the companion teeth 35 carried by the shiftable clutch member 31, the latter having a shifting groove 36 adapted in the well known manner to be manually shifted forwardly in response to a reverse drive setting of transmission 10 and for independent manual lockout control if desired as will be readily understood by those skilled in the art.

Before describing the structural details of my improved clutch 24, I will first briefly describe the general operation of the overdriving mechanism so that a typical application of my clutch will be readily understood. In an overdrive mechanism it is generally desirable to arrange the automatic clutch so that the overdrive will be established at or about a predetermined speed of motor vehicle travel, as for example forty miles per hour, and with such a setting of the automatic clutch a direct driving relationship between driving and driven shafts 11 and 13, respectively, is established prior to the engagement of the automatic clutch. This drive passes from drive shaft 11 through the overrunning clutch 28 and clutch device 31 to the driven shaft 13. Assuming the shift device to be in the position illustrated in Fig. 1, and further assuming that the motor vehicle is accelerated in the direct drive to a speed above the critical speed of operation of the automatic clutch 24, it will be apparent that during such times the pawl cage 23 will be rotated through the planetary gearing at a speed faster than the rotational speed of the shell 25 which always rotates at the speed of driven shaft 13 for the particular arrangement of parts illustrated. When the motor vehicle driver momentarily releases the usual accelerator pedal, the driving shaft 11 will slow down and the driven shaft 13 will continue its rotational speed by reason of the overrunning action at the clutch 28. This synchronizing action of the clutching structures of the automatic clutch 24 will very quickly synchronize the rotational speeds of the clutching structures whereupon the pawls, which will shortly be referred to in detail, will be projected into the slots 26 to establish a two-way drive at an overdrive ratio determined by the planetary gearing between shafts 11 and 13, the overrunning clutch 28 being automatically rendered inoperative by reason of its overrunning action during the time that the automatic clutch remains engaged.

The overdrive thus established passes from the drive shaft 11 through the carrier 16, planetary pinions 15 and thence to the internal gear 21 and automatic clutch 24 to drive the extension 27, clutch 31 and driven shaft 13 at the overdriving speed.

When the motor vehicle is decelerated from the overdriving condition, the automatic clutch will automatically disengage at some predetermined speed, usually five to ten miles per hour less than the critical speed of engagement, and when such disengagement takes place, the overrunning clutch 28 is automatically restored to usefulness in providing a direct drive between shafts 11 and 13 as aforesaid. When the direction of drive to the motor vehicle is reversed by reversing the normal direction of rotation of drive shaft 11, and at such other times as it may be desired to provide a direct two-way drive between shafts 11 and 13, it will be apparent that the overrunning clutch 28 must be locked out. This is accomplished by a forward shifting of the clutch device 31 to engage the clutch teeth 35 thereof with the teeth 34 whereupon the automatic clutch 24 as well as the overrunning clutch 28 will be locked out of operation.

Referring now particularly to Figs. 2 and 3 which illustrate one preferred embodiment of my automatic clutch, the pawl carrying cage 23 is rotatably centered within the shell 25 by the diametrically opposite pairs of guide projections 37 and 38 spaced from each other substantially at diametrically opposite points to provide a pair of outwardly extending guide ways 39 each of which slidably receives the clutching end portion 40 of a pawl 41. Each pawl 41 has a counterbalancing guide end portion 42 having a bore 43 forming a spring seat 44, the pawl end portions 40 and 42 being connected by an intermediate portion 45 curving at least partially around the shaft 11 and preferably conforming to the outer diameter thereof so that the shaft 11 will provide a bearing stop or seat for each pawl in the fully retracted position thereof as illustrated in Fig. 2. It will be noted that the counter-balancing guide portion 42 and the seat 44 are disposed to one side of a plane 46 through the axis of rotation 47 and perpendicular to a plane 48 lying in the direction of pawl movement, the pawl clutching portion 40 being disposed to the other side of the aforesaid plane 48. This arrangement of parts permits the use of a spring having the desired length and operating characteristics in controlling the pawl for a positive outward projection thereof at the particular desired critical speed.

Each guide projection 37 is formed with an outwardly opening guideway 49 preferably rectangular in cross-section to provide circumferentially spaced walls 50 and 51 slidably receiving walls of the correspondingly formed guide end portion 42 of a pawl 41. The axes of the coacting pairs of guideways 39 and 49 are parallel and relatively offset in a direction circumferentially of the pawl cage 23.

Each bore 43 is coaxial with the axis of an associated guideway 49 and receives the thrusting end portion of a coil spring 52 acting against the seat 44 and having its other end reacting on the face 53 of a projection 38 which also serves as a stop for the associated pawl when the latter moves outwardly to its clutching position. Each pawl therefore has its opposite end portions 40 and 42 respectively slidably disposed in the guideways 39 and 49 free from sliding contact with the other pawl since the guideways 49 are spaced circumferentially between the guideways 39. The springs 52 are disposed along opposite sides of shaft 11 and substantially adjacent thereto, the arrangement of parts being such that ample room is afforded to accommodate the desired length of spring.

Assuming the normal directions of rotation of the parts for a forward motor vehicle drive to be clockwise as indicated by the arrow 54 in Fig. 2, each pawl clutching portion 40 may be said to have its outer face provided with a leading portion 55 and a trailing portion 56 as more particularly described and claimed in the copending application, Serial No. 97,868, filed August 26, 1936. The trailing portion 56 which is preferably substantially less in circumferential length than the portion 55, is formed as a part of a cylindrical surface conforming with the inner surface of shell 25. The portion 55 is preferably a plane surface sloping circumferentially in the direction of rotation and inwardly at an angle which operates during the synchronizing action to strike the leading edges of the slots 26 at a glancing blow to thereby minimize the inward and outward movement of the pawls during the time that they are jumping the slots preparatory to clutching engagement therewith when the shell 25 and cage 23 are synchronized. This results in a minimization of noise incident to the pawl jumping action and also minimizes wear on the pawls and slots incident to their normal operation. The cylindrical portion 56 insures a bearing engagement with shell 25 during travel of each pawl between the slots 26 during the synchronizing action when the pawls are being projected outwardly and trying to enter the slots. Other forms of pawl cam faces may, of course, be employed if desired.

I do not limit my invention, in the broader aspects thereof, to the particular combination and arrangement of parts shown and described for illustrative purposes, since various modifications and changes will be apparent within the teachings of my invention as defined by the appended claims.

I claim:

1. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force acting on said pawl clutching portion, said pawl carrying structure having a guideway slidably receiving said counterbalancing pawl portion, and a coil spring reacting on said pawl carrying structure and thrusting against said counterbalancing pawl portion, said counterbalancing pawl portion having a bore approximately aligned with the axis of said guideway for receiving an end portion of said coil spring.

2. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force acting on said pawl clutching portion, said pawl carrying structure having a guideway formed with circumferentially spaced walls each slidably engaging a face of said counterbalancing pawl portion, and yielding means acting on said pawl.

3. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having a clutching end portion slidably engaging one of said openings and adapted for projection into one of said slots, said pawl carrying structure having guideways disposed at points spaced circumferentially between said openings for respectively slidably guiding the opposite end portions of said pawls, the opening and guideway for each pawl having their respective axes parallel with each other and offset from each other in a direction circumferentially of the pawl carrying structure.

4. In a centrifugal clutch, a rotatable shell having a pluarlity of slots, a pawl carrying structure rotatable within said shell and having a pair of substantially diametrically arranged outwardly extending openings, and a pair of pawls carried by said structure, each of said pawls having a clutching end portion slidable in one of said openings and adapted for projection into one of said slots, each of said pawls having a counterbalancing end portion so disposed as to be acted on by centrifugal force in opposition to centrifugal force inducing projection of the pawl clutching portion, said pawl carrying structure having guideways disposed at points spaced circumferentially between said openings for slidably guiding said counterbalancing pawl end portions.

5. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having a clutching end portion slidable in one of said openings and adapted for projection into one of said slots, each of said pawls having a counterbalancing end portion so disposed as to be acted on by centrifugal force in opposition to centrifugal force inducing projection of the pawl clutching portion, said pawl carrying structure having a pair of guideways each spaced circumferentially between said openings, each of said counterbalancing end portions being slidably disposed in one of said guideways.

6. In a centrifugal clutch, a rotatable shell having a pluarlity of slots, a pawl carrying structure rotatable within said shell and having a pair of substantially diametrically arranged outwardly extending openings, a pair of pawls carried by said structure, each of said pawls having a clutching end portion slidable in one of said openings and adapted for projection into one of said slots, each of said pawls having a counterbalancing end portion so disposed as to be acted on by centrifugal force in opposition to centrifugal force inducing projection of the pawl clutching portion, said pawl carrying structure having a pair of guideways each spaced circumferentially between said openings, each of said counterbalancing end portions being slidably disposed in one of said guideways, each of said counterbalancing end portions having a bore disposed substantially in alignment with one of said guideways, and a coil spring having an end portion thrusting in each of said bores.

7. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having a clutching end portion slidable in one of said openings and adapted for projection into one of said slots, each of said pawls having a counterbalancing end portion so disposed as to be acted on by centrifugal force in opposition to centrifugal force inducing projection of the pawl clutching portion, said pawl carrying structure having a pair of inwardly opening guideways disposed substantially diametrically opposite to each other, each of said guideways being disposed in circumferentially spaced relationship between said openings, each of said counterbalancing end portions projecting into one of said guideways.

8. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having a clutching end portion slidable in one of said openings and adapted for projection into one of said slots, each of said pawls having a counterbalancing end portion so disposed as to be acted on by centrifugal force in opposition to centrifugal force inducing projection of the pawl clutching portion, said pawl carrying structure having a pair of guideways each spaced circumferentially between said openings, each of said counterbalancing end portions being slidably disposed in one of said guideways, the axes of said openings and guideways being substantially parallel with each other.

9. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having a clutching end portion slidable in one of said openings and adapted for projection into one of said slots, each of said pawls having a counterbalancing end portion so disposed as to be acted on by centrifugal force in opposition to centrifugal force inducing projection of the pawl clutching portion, said pawl carrying structure having a pair of inwardly opening guideways disposed substantially diametrically opposite to each other, each of said guideways being disposed in circumferentially spaced relationship between said openings, each of said counterbalancing end portions projecting into one of said guideways, the axes of said openings and guideways being substantially parallel with each other.

10. In a centrifugal clutch, a rotatable shell having a plurality of slots, a pawl carrying structure rotatable within said shell and having an outwardly extending opening, said structure having a guideway extending substantially parallel with said opening and offset in a direction circumferentially therefrom, said guideway being disposed to one side of a plane containing the rotational axis of said structure and said opening, and a pawl carried by said structure, said pawl having a clutching end portion slidably engaging said opening and adapted for projection by centrifugal force into one of said slots, said pawl having a second end portion slidably disposed in said guideway and engaging the walls thereof to prevent displacement of this end portion in opposite directions relatively to and circumferentially of the pawl carrying structure, said pawl having a yoke portion connecting said end portions.

11. In a centrifugal clutch, a rotatable shell having a plurality of slots, a pawl carrying structure rotatable within said shell and having an outwardly extending opening, said structure having a guideway extending substantially parallel with said opening and offset in a direction circumferentially therefrom, said guideway being disposed to one side of a plane containing the rotational axis of said structure and said opening, and a pawl carried by said structure, said pawl having a clutching end portion slidably engaging said opening and adapted for projection by centrifugal force into one of said slots, said pawl having a second end portion circumferentially offset from said clutching end portion and slidably fitting in said guideway to prevent displacement of said second end portion in opposite directions relatively to and circumferentially of the pawl carrying structure, said pawl having a yoke portion connecting said end portions, and yielding means acting on said second end portion to oppose said projection of said clutching end portion.

CARL A. NERACHER.